Nov. 9, 1965   J. M. WEAVER   3,216,492
EXCHANGE UNIT
Filed July 3, 1961
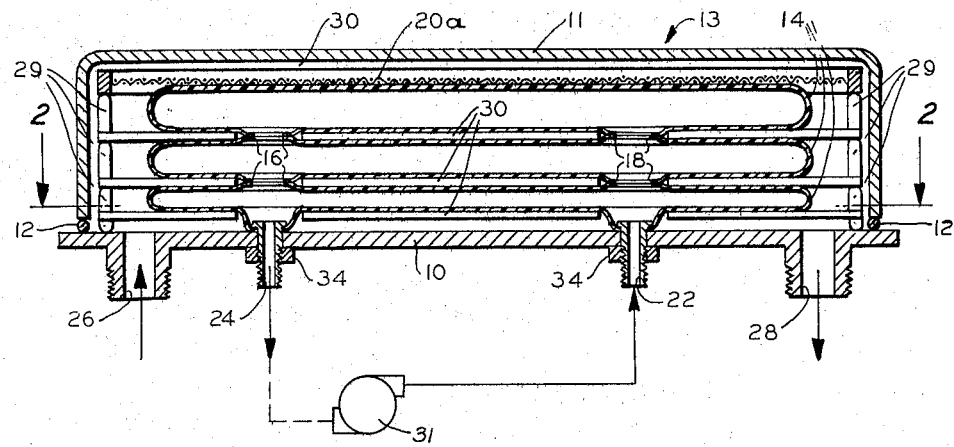
FIG_1
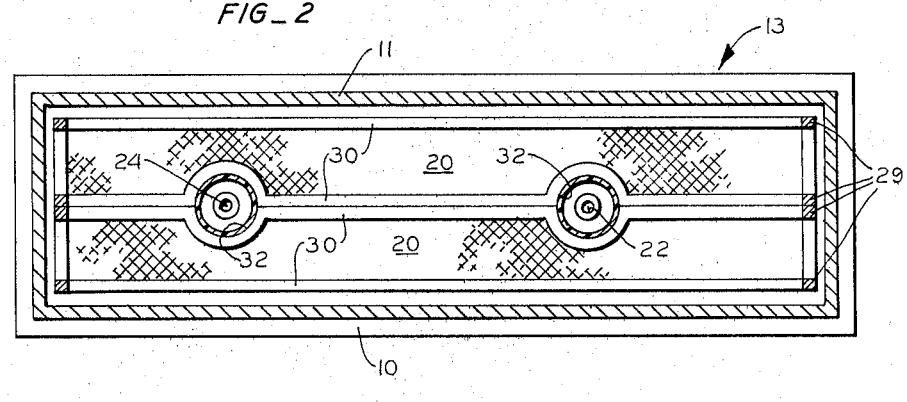
FIG_2
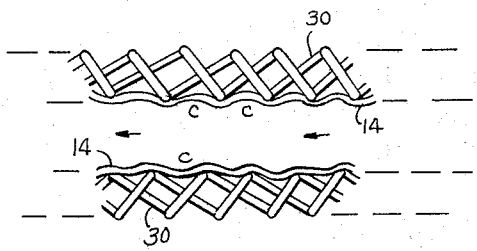
FIG.3
INVENTOR.
JOHN M. WEAVER
BY Hoppe & Mitchell
ATTORNEYS

United States Patent Office 3,216,492
Patented Nov. 9, 1965

3,216,492
EXCHANGE UNIT
John M. Weaver, 1266 Chestnut St., San Francisco, Calif.
Filed July 3, 1961, Ser. No. 121,577
2 Claims. (Cl. 165—46)

This invention relates to exchange units adaptable for heat exchange.

In accordance with the present invention, one or more flexible film envelopes are surrounded by means for supporting the envelope within predetermined dimensions and surrounded by a fluid with which to exchange heat with fluid matter contained within the envelopes. The pressure inside the envelope is maintained higher than the pressure outside the envelope in order to position the film against the surrounding support means.

Representative of usable flexible films are plastic films, metal foils, resin impregnated paper, and the like. The invention particularly contemplates the use of a disposable flexible plastic film as the material through which transfer is effected. Heretofore, rigid metals have conventionally been used as the transfer media in heat transfer units. Although the conductivity of plastic film is much lower than metals used as transfer media, the durability, expendability and difference in cost per square foot compared with usable metals renders the use of thin plastic materials as transfer media very desirable. The surrounding support means combined with the maintenance of a higher pressure within than without the envelopes enables the use of very thin inexpensive plastic films. This thin gauge film minimizes the thermal transfer inefficiency of plastics to compare favorably with rigid metals. Reference is made to my article appearing in Chemical Engineering Progress (Vol. 56, No. 7) of July 1960, which demonstrates that a metal such as Monel conventionally used as a transfer media has a cost roughly 8 times that of polyester film.

Another advantage residing in the utilization of plastic films is that they can be non-toxic and are ordinarily non-reactive with dilute acids, bases and salts.

A further object resides in the manifolding of the envelopes. The envelopes are apertured, aligned with the apertures in registry and heat sealed or otherwise joined as by grommets at the peripheries of the apertures. In this manner the necessity for connecting tubing is eliminated.

Another feature resulting from the use of flexible envelopes is the fact that the envelopes may be compressed to completely exhaust them. Thus, for example where used for extracorporeal blood circulation of a patient, the envelopes may be collapsed to return all blood to the patient.

The flexible envelopes biased against supporting means having an irregular surface effect turbulence of fluid within the envelopes. This turbulence materially enhances heat transfer.

The invention combines economy of manufacture with efficiency and durability of use.

These and other objects will be appreciated upon reading the following written description with reference to the accompanying drawings, wherein:

FIG. 1 is a cross-section in side elevation of an exchange unit illustrative of the present invention; and FIG. 2 is a view taken substantially on line 2—2 of FIG. 1 and showing in plan one of the removable grid units.

The invention particularly resides in the use of thin plastic films as the transfer media. Representative but not exclusive of usable plastic films are polytetrafluoroethylene, polyester, and polyolefins such as polypropylene and polyethylene.

A specific embodiment of the invention will be described with reference to medical use viz., extracorporeal blood circulation to cool or warm the blood.

The exchange unit designed for medical purposes illustrated in FIG. 1 includes a base 10, and a cover 11 which is provided at its bottom with an O-ring gasket 12. The cover supported on the base provides the shell 13 for the transfer unit.

Enclosed within the shell are illustrated three polyester envelopes 14 of about 0.001 in. thickness manifolded together as at 16 and 18 by a heat seal. Means for spacing the envelopes have been illustrated as crimped wire mesh 20 which also served to space envelopes 14 from the inner surfaces of shell 13.

An inlet port 22 communicates with envelopes 14 and outlet 24 permits exacuation of the envelopes. Inlet port 26 and outlet port 28 afford circulation of a fluid around the envelopes either concurrent or counter-current to the flow in the envelopes.

FIG. 2 is a plan view of one of the spacer elements 20, specifically illustrating the two-piece formation of all but the top spacers. The spacers are designed with uprights 29 to support and space the overlying spacer. They are formed of crimped wire mesh and are marginally reinforced as at 30. The bottom three spacers are each formed in two pieces (FIG. 2) with semi-circular recess forming aperture as at 32 to enclose the manifold junctures of the envelopes. Formed in this manner, the spacers are easily removable for cleaning and particularly for replacement of envelopes 14. The top spacer 20a may be formed as a single member.

To assemble the unit a bottom pair of spacers 20 is placed on base 10 and the manifolded envelopes 14 are placed on the spacer with ports 22 and 24 passing through apertures in base 10. These ports are fittings secured to envelopes 14 and externally threaded to receive lock nuts 34 which secure the envelopes to the base. The remaining spacers 20 are then inserted between individual envelopes, spacer 20a is placed on top of the assembly and it is covered with cover 11.

As stated hereinabove the interior of the flexible envelope normally is maintained at a pressure higher than the fluid pressure surrounding it, such as by pump means 31, so that the flexible envelope 14 is biased against the supporting mesh 30 to produce an irregular transfer surface as is illustrated in FIG. 3. This irregular surface causes turbulence even for low flow rates in the fluid flowing through the envelope side of the exchanger. This turbulence materially increases the rate of heat transfer from the fluid to the envelope or vice versa. In addition, biasing the flexible envelope develops actual contact between the envelope and supporting mesh. This permits rapid heat transfer by conduction between the envelope wall and the mesh. Because of this contact the supporting mesh acts as an extended metallic heat transfer surface thermally connected to the flexible film envelope.

In use of the specifically described unit, it may be assumed that heat exchange is to be effected between human blood and other media such as water.

Blood may be entered through inlet port 22 to circulate through envelopes 14 and be exhausted through outlet port 24. Simultaneously, water of a temperature dependent upon the desired result is entered through inlet port 26 and exhausted through outlet port 28. The result is the economical and efficient transfer of heat.

The invention has been described with particular reference to an exchange unit adapted for medical purposes. It will be appreciated that modifications may be practiced within the spirit of the invention as limited only by the scope of the appended claims.

What is claimed is:

1. A transfer unit comprising, a shell having first and second pairs of spaced ports, a plurality of flexible plastic envelopes within the shell, said envelopes being interconnected about spaced openings in adjacent walls thereof to provide thereby for parallel flow through said envelopes, means removably interconnecting one pair of spaced openings of one said envelope with the first pair of ports in said shell to provide thereby for the ingress and egress of fluids of the shell and through said envelopes, spacer means separating the surfaces of the envelopes from one another, said spacer means each being constructed of a pair of longitudinally divided sections with complementary abutting surfaces and recessed portions defining apertures surrounding the interconnections between envelopes whereby removal of said spacer sections and said envelopes as a unit from the shell is facilitated, means within the shell to support the spacers in spaced relation to the shell and to each other, said second pair of spaced ports constituting inlet and outlet means for a second fluid to be directed about the exterior of said envelopes in heat exchange relationship therewith.

2. The invention according to claim 1 wherein each said spacer means comprises a crimped wire mesh member.

References Cited by the Examiner
UNITED STATES PATENTS

| | | | |
|---|---|---|---|
| 2,157,744 | 5/39 | Welty | 165—141 |
| 2,511,084 | 6/50 | Shaw | 165—157 X |
| 2,617,634 | 11/52 | Jendrassik | 165—140 |
| 2,782,008 | 2/57 | Caughill | 165—67 |
| 2,845,929 | 8/58 | Strumia | 128—214 X |
| 2,981,253 | 4/61 | De Wall et al. | 128—214 |
| 2,998,817 | 9/61 | Armstrong | 128—400 X |
| 3,051,316 | 8/62 | MacNeill | 128—214 X |
| 3,060,934 | 10/62 | Claff et al. | 128—214 |

CHARLES SUKALO, *Primary Examiner.*

HERBERT L. MARTIN, *Examiner.*